United States Patent
Park et al.

(10) Patent No.: US 11,581,547 B2
(45) Date of Patent: Feb. 14, 2023

(54) ELECTRODE INK DEPOSITION SYSTEM FOR HIGH-THROUGHPUT POLYMER ELECTROLYTE FUEL CELL

(71) Applicant: UCHICAGO ARGONNE, LLC, Chicago, IL (US)

(72) Inventors: Jae Hyung Park, Bolingbrook, IL (US); Deborah J. Myers, Lisle, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/425,047

(22) Filed: May 29, 2019

(65) Prior Publication Data

US 2020/0381744 A1    Dec. 3, 2020

(51) Int. Cl.
| | |
|---|---|
| H01M 4/88 | (2006.01) |
| B05B 1/02 | (2006.01) |
| B05C 13/00 | (2006.01) |
| B05C 11/10 | (2006.01) |
| H01M 8/10 | (2016.01) |

(52) U.S. Cl.
CPC ............ H01M 4/8828 (2013.01); B05B 1/02 (2013.01); B05C 11/1013 (2013.01); B05C 11/1034 (2013.01); B05C 13/00 (2013.01); H01M 4/881 (2013.01); *H01M 2008/1095* (2013.01)

(58) Field of Classification Search
CPC ............................. H01M 4/8828; H01M 4/881
See application file for complete search history.

(56) References Cited

U.S. PATENT DOCUMENTS

| | | | | |
|---|---|---|---|---|
| 4,849,253 A | * | 7/1989 | Maricle ................. | H01M 4/886 427/115 |
| 5,350,452 A | * | 9/1994 | Rempe ................. | B05B 12/122 118/669 |

(Continued)

OTHER PUBLICATIONS

Merriam-Webster, "Definition of Movable", p. 2, Dec. 23, 2020 (Year: 2020).*

(Continued)

*Primary Examiner* — Karl Kurple
(74) *Attorney, Agent, or Firm* — Marshall, Gerstein & Borun LLP

(57) ABSTRACT

Systems for creating electrodes for polymer electrolyte membrane fuel cells include an XY stage having a heated vacuum table physically coupled to the XY stage. The vacuum table has a working face with a plurality of channels formed therein to communicate vacuum pressure from a port coupled to a vacuum source to the channels. A sheet of perforated heat-conductive material has staggered holes configured to evenly distribute the vacuum pressure from the channels through the perforated sheet. A heat-conductive wire mesh is placed over the perforated sheet, and has openings smaller than the staggered holes such that a membrane material placed on the wire mesh is not deformed by the vacuum pressure. A nanopipette or micropipette coupled to a pump is configured to deposit electrode ink onto an exposed surface of the membrane material as the controller device causes the XY stage to move the vacuum table to control deposition of the electrode ink onto the surface of the membrane material.

15 Claims, 11 Drawing Sheets

(56) References Cited

U.S. PATENT DOCUMENTS

| | | | | |
|---|---|---|---|---|
| 5,968,445 | A * | 10/1999 | McCarville | B29C 70/44 156/285 |
| 6,173,948 | B1 * | 1/2001 | Hall | B25B 11/005 165/80.5 |
| 6,202,734 | B1 * | 3/2001 | Sackinger | B22F 9/14 164/271 |
| 6,308,405 | B1 * | 10/2001 | Takamatsu | B05D 1/202 205/68 |
| 2002/0034928 | A1 * | 3/2002 | Doan | B24D 9/085 451/285 |
| 2004/0081759 | A1 * | 4/2004 | Maruyama | B05C 5/0225 427/256 |
| 2004/0224204 | A1 | 11/2004 | Smotkin et al. | |
| 2004/0246309 | A1 * | 12/2004 | Watanabe | B41J 2/17509 347/55 |
| 2005/0010329 | A1 * | 1/2005 | Bang | B05C 5/0216 700/240 |
| 2005/0098101 | A1 * | 5/2005 | Shen | B05B 17/063 118/696 |
| 2005/0236765 | A1 * | 10/2005 | Puffer | B65H 29/241 271/307 |
| 2006/0024551 | A1 | 2/2006 | Smotkin | |
| 2006/0210443 | A1 * | 9/2006 | Stearns | G01N 35/1074 422/400 |
| 2007/0009650 | A1 * | 1/2007 | Cho | B05C 5/0216 427/8 |
| 2007/0013736 | A1 * | 1/2007 | Higginson | B41J 2/17596 347/37 |
| 2007/0070107 | A1 * | 3/2007 | Shamoun | B41J 29/393 347/14 |
| 2008/0075842 | A1 * | 3/2008 | Brewster | H01M 8/0273 427/115 |
| 2008/0079890 | A1 * | 4/2008 | Sugahara | H05K 3/1266 349/151 |
| 2008/0093753 | A1 * | 4/2008 | Schuetz | B29C 51/365 264/1.9 |
| 2008/0152821 | A1 * | 6/2008 | Gardner | B41J 11/06 427/421.1 |
| 2009/0074956 | A1 | 3/2009 | Taylor | |
| 2010/0175759 | A1 * | 7/2010 | Ikushima | G02F 1/1339 137/15.01 |
| 2010/0285573 | A1 * | 11/2010 | Leek | G01N 1/31 435/288.4 |
| 2014/0055721 | A1 * | 2/2014 | Choi | G02F 1/133528 349/96 |
| 2014/0124600 | A1 * | 5/2014 | Ciardella | B41J 2/045 239/569 |
| 2014/0318210 | A1 * | 10/2014 | Tremel | B05B 12/122 118/669 |
| 2015/0211122 | A1 * | 7/2015 | Chang | H01M 4/886 427/115 |
| 2015/0328649 | A1 * | 11/2015 | Carcasi | G03F 7/162 427/426 |
| 2016/0228903 | A1 * | 8/2016 | Redjdal | B05B 17/0646 |
| 2018/0193870 | A1 * | 7/2018 | Ngo | B05C 1/06 |
| 2018/0214903 | A1 * | 8/2018 | Ikushima | B01F 11/0074 |

OTHER PUBLICATIONS

Wang et al., "Effects of Nation impregnation using inkjet printing for membrane electrode assemblies in polymer electrlyte membrane fuel cells," *Electrochimica Acta* 129, pp. 343-347 (2014).

Shukla et al., "Analysis of Low Platinum Loading Thin Polymer Electrolyte Fuel Cell Electrodes Prepared by Inkjet Printing," *Electrochimica Acta* 156, pp. 289-300 (2015).

Taylor et al., Inkjet printing of carbon supported platinum 3-D catalyst layers for use in fuel cells, *Journal of Power Sources* 171, pp. 101-106 (2007).

Towne et al., "Fabrication of Polymer electrolyte membrane fuel cell MEAs utilizing inkjet print technology," *Journal of Power Sources* 171, pp. 575-584 (2007).

* cited by examiner

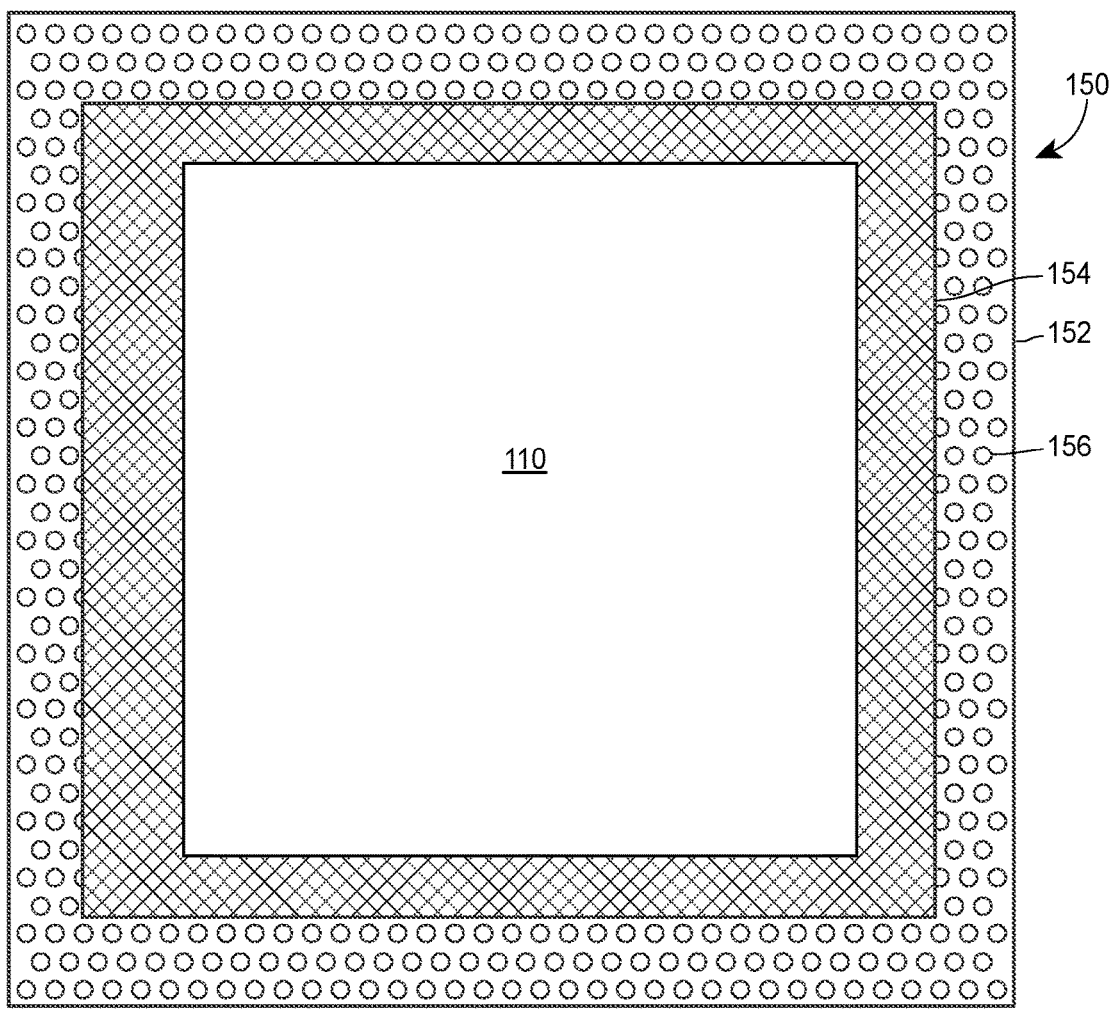
FIG. 8A
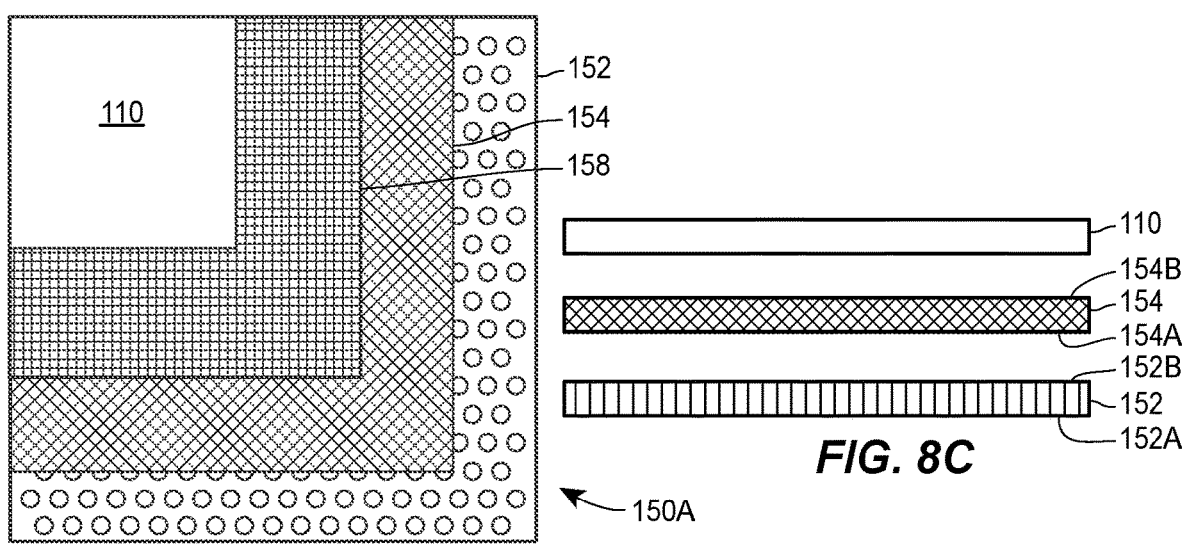
FIG. 8B
FIG. 8C

ELECTRODE INK DEPOSITION SYSTEM FOR HIGH-THROUGHPUT POLYMER ELECTROLYTE FUEL CELL

STATEMENT REGARDING FEDERALLY SPONSORED RESEARCH OR DEVELOPMENT

This invention was made with government support under Contract No. DE-AC02-06CH11357, awarded by the U.S. Department of Energy to UChicago Argonne, LLC, operator of Argonne National Laboratory. The government has certain rights in the invention.

FIELD OF THE DISCLOSURE

The present disclosure is directed to fuel cell technology and, in particular, to methods and systems for rapid and precise fabrication of membrane electrode assemblies of such fuel cells to facilitate rapid testing and characterization of electrode materials with minimal waste of electrode materials.

BACKGROUND

As new applications of battery and fuel cell technology continue to emerge, a variety of factors are driving the development Polymer Electrolyte Membrane or Proton Exchange Membrane Fuel Cells (PEMFCs). One example of such an application is electric vehicles (EVs), which, as a result of the desire to lower vehicle emissions and emissions in general, are becoming more common. For EVs to be practical and successful in the market, they require power sources (e.g., batteries) or energy conversion devices that convert fuel to electricity with high efficiency (e.g., fuel cells) with a number of attributes. The EV application requires low operating temperatures for quick start, safe operation, and high energy density to achieve maximum range with minimal weight and volume.

In general, fuel cells are electrochemical devices that convert energy from a fuel and an oxidizing agent into electricity. FIG. 1 illustrates a PEMFC at its most basic level. Fuel provided to an anode causes electrons to migrate across an electrolyte to a cathode supplied with an oxidizing agent. In many fuel cells, the fuel is hydrogen and the oxidizing agent is oxygen, typically from air. The hydrogen combines with the oxygen to produce electricity and water. PEMFCs use a polymer membrane for the electrolyte, removing liquid electrolytes from the picture.

Though PEMFCs have a variety of components, as illustrated in FIG. 2, the "heart" of a PEMFC is the membrane electrode assembly (MEA). The MEA is typically a polymer membrane having on each side of it a catalyst-coated carbon paper or a catalyst-coated membrane placed between two carbon papers. A solubilized form of the membrane (i.e., ionomer) is typically used as a binder and to provide proton conductivity in the electrode layers. MEAs are fabricated by applying this catalyst-ionomer-solvent "ink" to a carbon paper to form a gas diffusion electrode (GDE) with subsequent hot-pressing to the membrane or by applying the catalyst ink to a substrate with subsequent transfer to the membrane or directly to the membrane to form a catalyst-coated membrane (CCM). The most common catalyst is Platinum, though other noble metals may be used. Platinum is preferred because of its high catalytic activity and stability. However, the high costs of Platinum and other noble metals used for catalysts remains a key challenge slowing commercialization and adoption of fuel cell technology, especially for automotive uses. Therefore, finding alternative catalysts and, in particular, platinum group metal free (PGM-free) catalysts, is a priority of many research groups studying fuel cells.

Testing MEAs manufactured with different catalysts and/or membranes for analysis of performance and stability can be a laborious and time-consuming process. For example, a conventional single cell test setup can require an entire day to complete fuel cell performance measurements: warming up the cell/humidifier system, conditioning the electrode, acquiring polarization curve and other diagnostic data, and assembling/disassembling the cell and test setup. Commercial systems exist that can test the performance of multiple cathodes simultaneously, however such systems require precise placement on the membrane of each cathode being tested, which negates some of the benefits of being able to test multiple cathodes simultaneously.

While some conventional fabrication techniques, such as spraying electrode ink over a mask to make patterned electrodes on a membrane, allow for the fabrication of multiple electrodes in a particular pattern dictated by the multi-electrode cell hardware, such techniques each have their drawbacks. It is difficult to control precise catalyst loading when spraying the electrode ink, for example, and much of the ink is sprayed onto the mask, resulting in unnecessary waste. It is also more difficult to apply different catalyst formulations at each of the spots in the electrode pattern.

SUMMARY OF THE DISCLOSURE

One embodiment of a system according to the present disclosure includes a linear stage having a platform and a base, the platform movable along X and Y axes according to electronic signals received from a controller device communicatively coupled to the linear stage. A vacuum source is configured to create vacuum pressure is coupled to a vacuum port of a heated vacuum table physically coupled to the platform of the linear stage and having a working face parallel to both the X and Y axes. The working face has, formed therein, a plurality of channels in fluid communication with the vacuum port formed in the vacuum table. The system also includes a sheet of perforated heat-conductive material sized to fit on the working face of the vacuum table the sheet having a table-facing side placed against the working face of the vacuum table and a mesh-facing side, and having staggered holes configured to evenly distribute the vacuum pressure from the plurality of channels to the mesh side of the sheet. Further, system includes a heat-conductive wire mesh having a sheet-facing side placed against the mesh-facing side of the sheet and a working side, the wire mesh having openings smaller than the staggered holes such that a membrane material placed on the working side of the wire mesh is not deformed by the vacuum pressure. The system includes a nanopipette or micropipette coupled to a pump and configured to deposit ink onto an exposed surface of the membrane material as the controller device causes the linear stage to move the heated vacuum table to control deposition of the ink onto the exposed surface of the membrane material.

An embodiment of a method for creating a catalyst coated membrane electrode according the present description includes placing a membrane material onto a heated vacuum table assembly, positioning a nanopipette or micropipette adjacent to the membrane material, and coupling the nanopipette or micropipette to a source of electrode ink, the electrode ink comprising a solvent, a catalyst, and an ionomer. The method also includes operating a pump coupled to the nanopipette or micropipette and to the source of electrode ink to cause the electrode ink to be dispensed from the nanopipette or micropipette, and moving the heated vacuum table assembly relative to the nanopipette or micropipette to cause the electrode ink to be deposited onto the membrane material in a pattern defined by the movement of the heated vacuum table.

BRIEF DESCRIPTION OF THE DRAWINGS

The following detailed description will be more easily and better understood when considered in conjunction with the following figures, in which like reference numbers are employed to designate like structures. It should be understood that, with the exception of magnified images, the drawings are not to scale, as scaled drawings would not facilitate an understanding of the depicted structures.

FIGS. 8A to 8C illustrate various arrangements of layered materials placed on the vacuum table in various embodiments;

DETAILED DESCRIPTION

Figure 1:
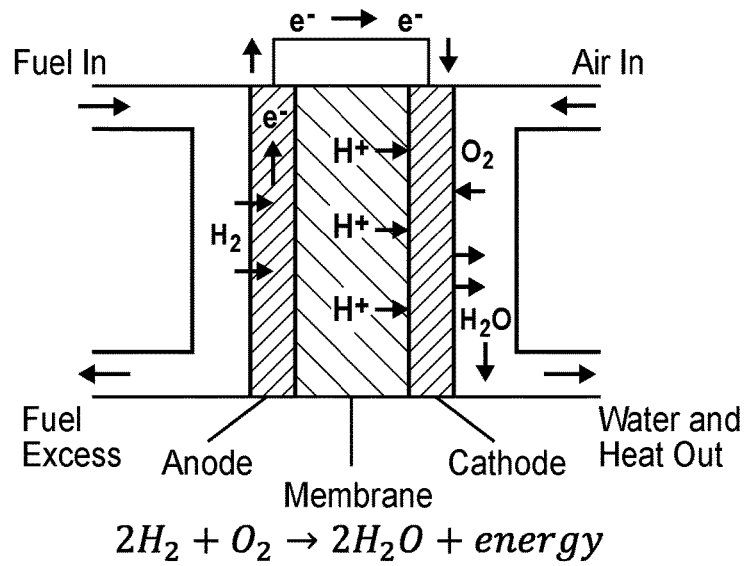
FIG. 1 is a diagram illustrating the principle of operation of a polymer electrolyte membrane fuel cell.
Figure 2:
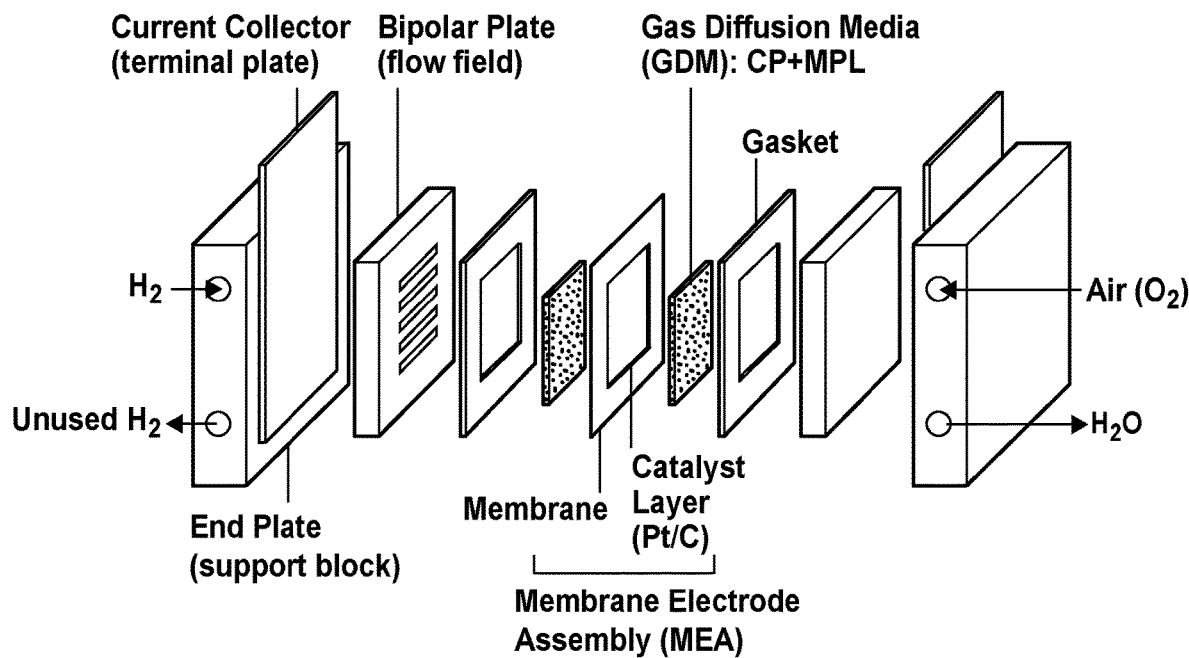
FIG. 2 is a diagram illustrating a polymer electrolyte membrane fuel cell assembly.
Figure 3:
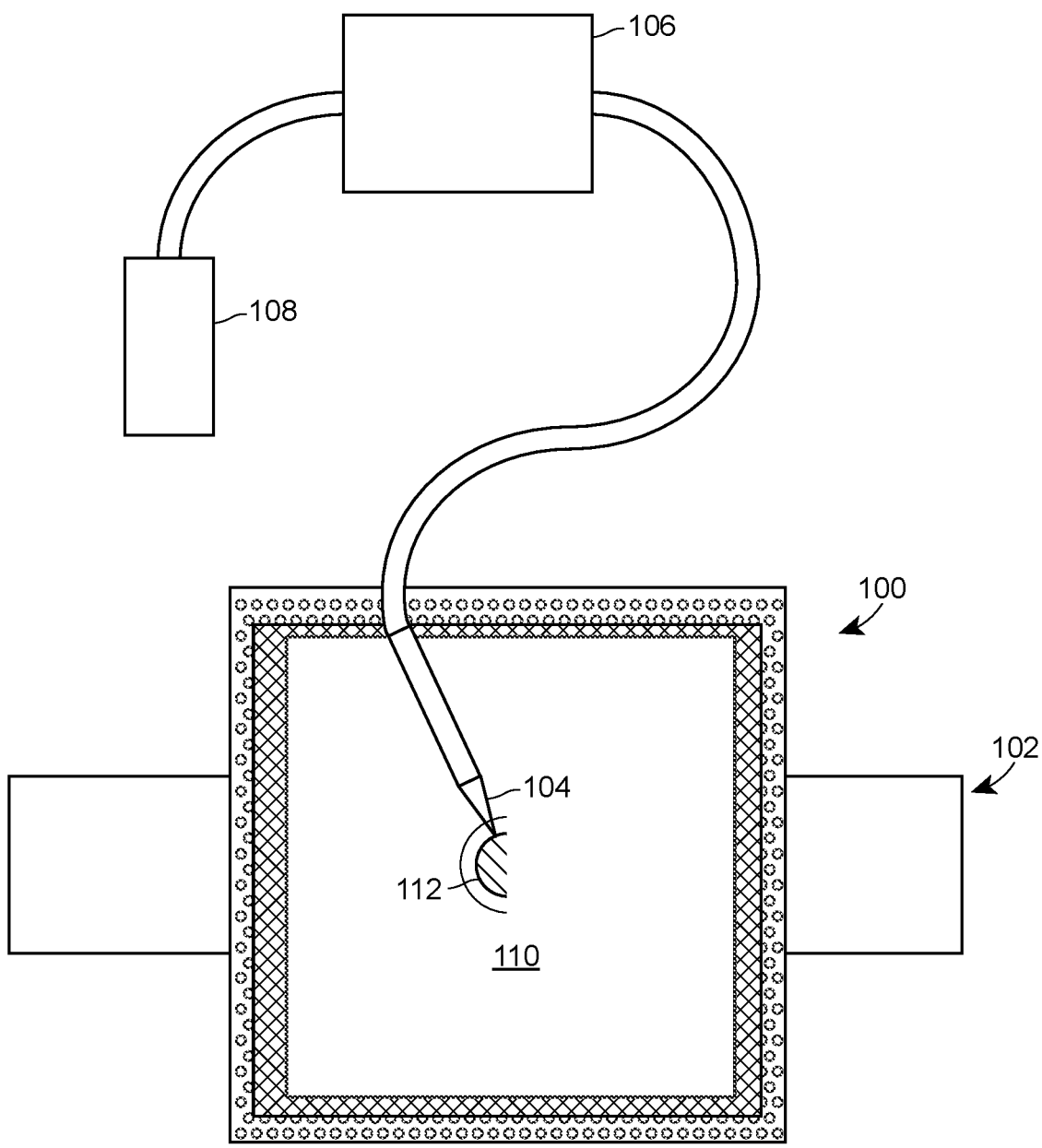
FIG. 3 is an illustration of a system for creating a fuel cell according to the present disclosure.

Methods and systems in accordance with the present description overcome the limitations of prior art methods of producing MEAs (also referred to herein as electrodes) generally and, in particular, of accurately and reproducibly fabricating MEAs in a configuration compatible with high throughput test fixtures used to characterize and test the MEAs. With reference to FIG. 3, the methods and systems described herein employ a vacuum table assembly 100 mounted on a high-precision, computer-controlled XY stage 102 (also referred to as a linear stage) that positions the vacuum table assembly 100 relative to a nanopipette or micropipette 104. A high-precision low flow rate pump 106 controlled in coordination with the XY stage 102 delivers electrode ink from an ink source 108 to the pipette 104 and onto a substrate membrane 110 mounted on the vacuum table assembly 100 to from an electrode 112.

Figure 4:
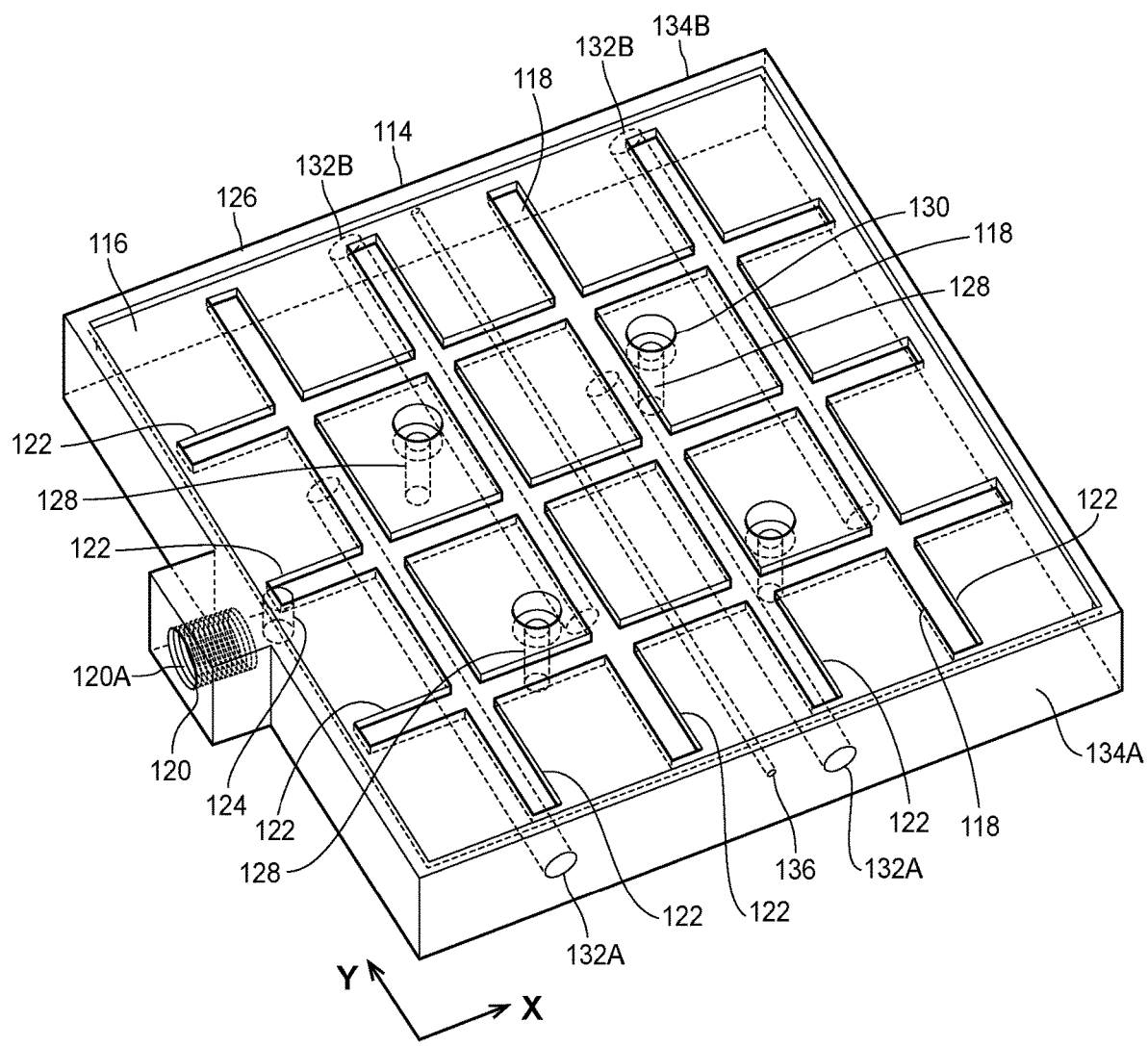
FIG. 4 is a perspective view of a vacuum table according to the present description.
Figure 5:
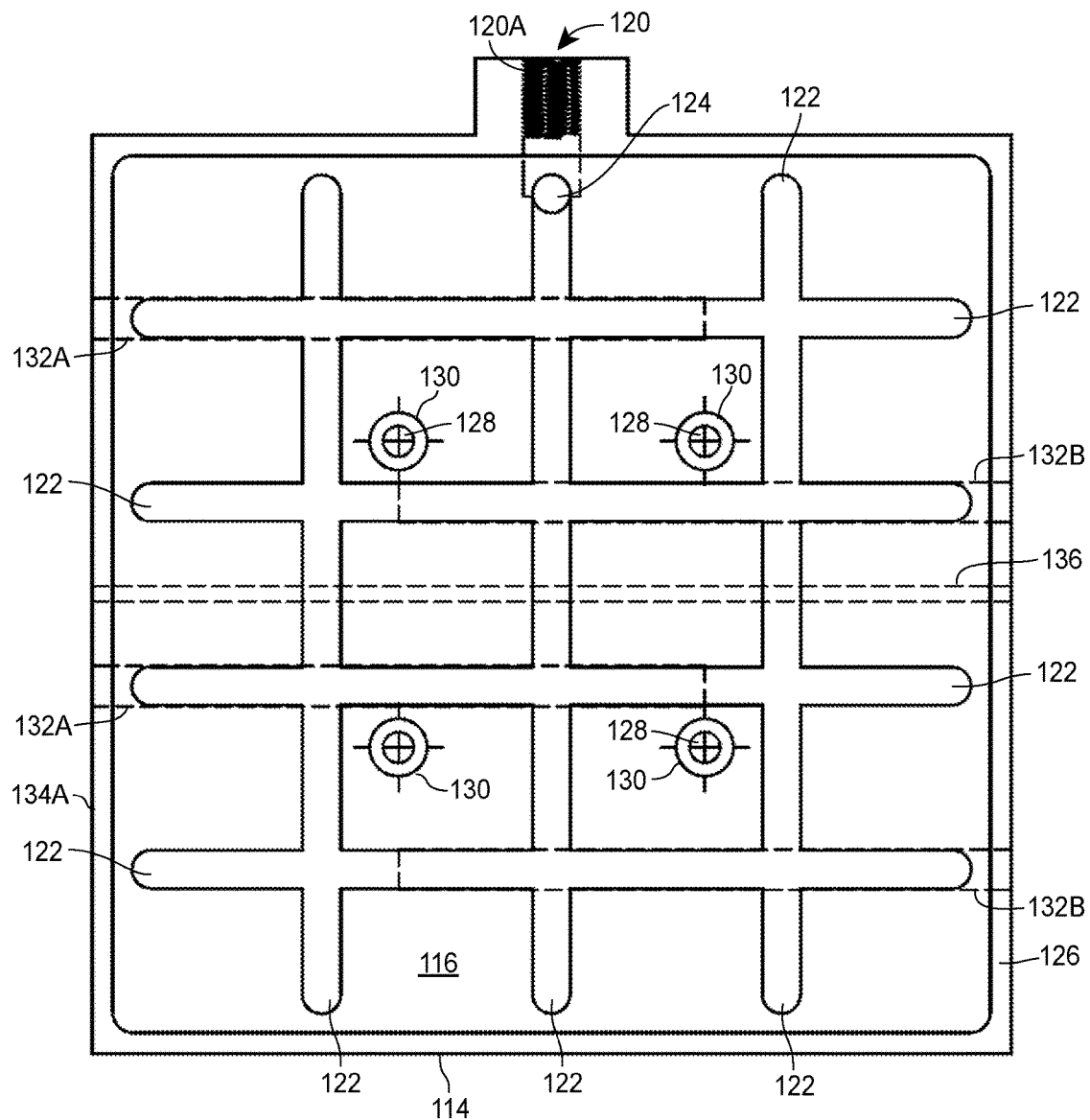
FIG. 5 is a top plan view of the vacuum table of FIG. 4.
Figure 6:
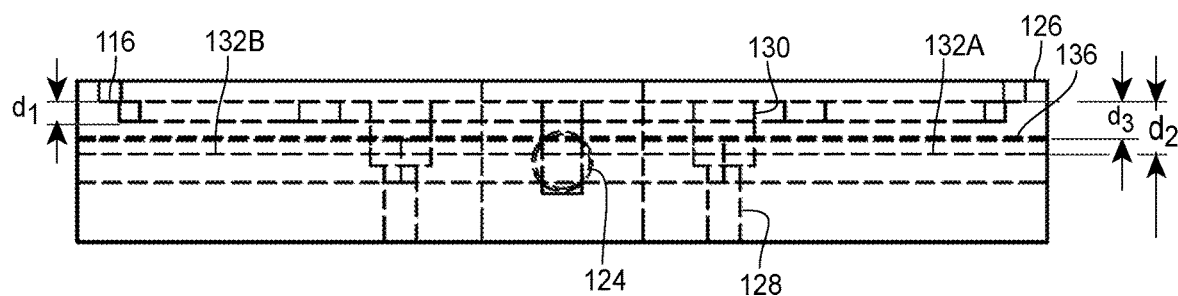
FIG. 6 is a side elevation view of the vacuum table of FIG. 4.

The vacuum table assembly 100 includes a vacuum table 114, one embodiment of which is depicted in perspective view in FIG. 4, in a top plan view in FIG. 5, and in a front elevation view in FIG. 6. The vacuum table 114 is generally a machined or injection molded form having a planar surface 116 that serves as a working face of the vacuum table. One or more channels 118 formed in the planar surface 116 serve to provide fluid communication between the planar surface 116 and port 120 to which a vacuum source may be coupled, such that, when vacuum is applied to the port 120, air may be drawn through the channels 118 to the port 120. As should be understood, a planar sheet placed against the planar surface 116 may be held against the planar surface 116 by a vacuum created in the channels 118 when suction is applied at the port 120. In particular, the membrane 110 of the MEA, onto which the electrode ink is deposited in order to create the electrode, is held securely by the vacuum. Additionally, while the solvent that makes up the electrode ink may cause the membrane 110 to deform, the vacuum may maintain the membrane 110 in a generally planar form.

In embodiments, the membrane 110 is formed of a synthetic polymer and, in particular ones of these embodiments, the synthetic polymer is an ionomer polymer. One example of an ionomer polymer that may be employed as the membrane 110 is a sulfonated tetrafluoroethylene based fluoropolymer-copolymer, such as Nafion® perfluorinated membrane registered trademark of The Chemours Company FC, LLC.

The electrode ink may comprise one or more catalysts, one or more ionomers, and carbon in a solvent, in embodiments. The ratios of the catalyst(s), ionomer(s), carbon, and solvent, and the particular substances used for each, may vary from ink to ink.

In embodiments, such as that depicted in FIGS. 4-6, the port 120 may formed as a channel in the vacuum table 114, and may have internal threads 120A for coupling a conduit (not shown in FIGS. 4-6) extending between a vacuum pump (not shown in FIGS. 4-6) and the port 120. As should be understood, in other embodiments, the port 120 may protrude from the vacuum table 114, and may have external threads for coupling the conduit extending between the port and the vacuum pump.

In an embodiment, the channels 118 are formed in the planar surface 116 as a plurality of intersecting, linear channels 122 (as depicted in FIGS. 4-6), such that each of the linear channels 122 extends in one direction across the planar surface 116 from one side of the planar surface 116 to an opposing side of the planar surface 116. In the embodiment of FIGS. 4-6, four linear channels 122 extend parallel to an arbitrarily selected Y-axis along an arbitrarily selected X-axis, while three linear channels 122 extend parallel to the X-axis along the Y-axis. Preferably, the linear channels 122 spaced along a particular dimension are evenly spaced, though this is not necessarily a requirement. Likewise, while not required, it is preferable that the linear channels 122 extend almost entirely from a first side of the planar surface 116 to an opposing side of the planar surface 116. In embodiments, the linear channels 122 extend to within 0.125 inches from each side of the planar surface 116. In other embodiments, the linear channels 122 may extend to within about 0.1 inches, about 0.2 inches, about 0.25 inches, about 0.5 inches, about one inch, or more than one inch from each side of the planar surface 116. In still other embodiments, the linear channels 122 may extend to the edges of the planar surface 116.

While depicted in FIGS. 4-6 as linear channels 122, the one or more channels 118 need not be linear in all embodiments. Other arrangements of channels, while not depicted, are nevertheless expressly contemplated, including concentric circular channels, nested rectangular channels, boustrophedonic channels, spiral channels, and the like, so long as the channels are configured such that vacuum pressure applied at the port 120 is generally communicated to all portions of the channel or channels. Additionally, while it is preferable that the channels 118 are symmetrical across the planar surface 116, such symmetry is not a requirement.

The one or more channels 118 in the planar surface 116 may have a depth, d1, relative to the planar surface 116, that is exceeded by their width. For example, in an embodiment, the width of each channel is 0.25 inches, while the depth of each channel is 0.125 inches.

In embodiments, a channel 124 couples the one or more channels 118 in the planar surface 116 to the port 120. The channel 124 may be orthogonal to channels 118 and also to the port 120, in embodiments, but need not be orthogonal so long as the channel 124 provides fluidic communication between the port 120 and the channels 118. Further, while FIGS. 4-6 depict a single channel 124 fluidically coupling the plurality of channels 118 in the planar surface 116 to the port 120, in embodiments, multiple channels 124 may couple the port 120 to the channels 118 in the planar surface 116. Further, the various channels 118 in the planar surface 116 may be fluidically coupled to one another by intersections between the channels 118, as depicted in FIGS. 4-6, or may be fluidically coupled to one another via multiple channels 124, as should be readily understood.

In embodiments, the planar surface 116 may be bounded by a raised lip 126 (i.e., a raised piece along the edge) extending along the perimeter of the planar surface 116. The lip 126 may serve to assist in properly positioning other components of the table assembly 100 (described below), as well as in maintaining vacuum pressure between those other components and the one or more channels 118 formed in the planar surface 116.

One or more apertures 128 may extend orthogonally through the vacuum table 114 between the planar surface 116 and an opposing surface of the vacuum table 114 to facilitate secure connection of the vacuum table 114 to the XY stage 102. In embodiments, the apertures 128 may each include a counterbore 130 such that a head of a fastener (not shown) inserted into the aperture 128 is disposed below the planar surface 116 and does not prevent other components placed on the planar surface 116 from sitting flush with the planar surface 116. Of course, the vacuum table 114 may be secured to the XY stage 102 using methods other than fasteners inserted into apertures, such methods including clamps, slide locks, welds, rivets, etc.

In embodiments, the vacuum table 114 is configured to be heated. Heating the vacuum table may advantageously facilitate improved and/or accelerated evaporation of the ink solvent from the membrane 110 as ink is deposited on the membrane 110. As depicted in FIGS. 4-6, in embodiments, the vacuum table 114 is formed from a thermally-conductive material (e.g., metal) and includes a plurality of apertures 132A, 132B into which heating elements (not shown) may be inserted. The apertures 132A, 132B may be arranged such that heat generated by the heating elements is distributed evenly within the surface of vacuum table 114. In FIGS. 4-6, for example, the apertures 132A are formed in a first perimeter surface 134A, and the apertures 132B are formed in a second perimeter surface 134B opposite the first perimeter surface 134A. In embodiments, the apertures 132A, 132B are positioned symmetrically about one, two, or more than two axes parallel to the planar surface 116, and/or such that the heating elements inserted into the apertures 132A, 132B are positioned symmetrically about one, two, or more than two axes parallel to the planar surface 116. A depth, d2, of the apertures 132A, 132B below the planar surface 116 will be greater than the depth, d1, of the one or more channels 118.

The vacuum table 114 may be heated to a desired temperature according to a variety of factors including the temperature at which the ink solvent (e.g., water, alcohol, etc.) evaporates, the membrane material's composition, and the like. In embodiments, the vacuum table 114 is heated to a temperature high enough to quickly evaporate the ink solvent before shrinking or swelling the membrane 110. In particular embodiments, the vacuum table 114 is heated to a temperature between 80° C. and 90° C., or to a temperature between 80° C. and 110° C., or to a temperature between 80° C. and 100° C.

An additional aperture 136 may extend from one of the perimeter surfaces (e.g., from the surface 134A, the surface 134B, etc.) into the vacuum table 114. The aperture 136 may facilitate insertion into the vacuum table 114 of a temperature sensor such as a thermistor or other temperature probe (not shown) that can measure a temperature of the vacuum table 114. In embodiments, the aperture 136 extends into the vacuum table 114 at a depth, d3, from the planar surface 116 that exceeds the depth, d1, of the one or more channels 118, but does not exceed the depth, d2, of the apertures 132A, 132B. The temperature probe may communicate a feedback signal representative of the measured temperature to a controller (described below) according to which the controller may increase or decrease the temperature of the heating elements.

Figure 7:
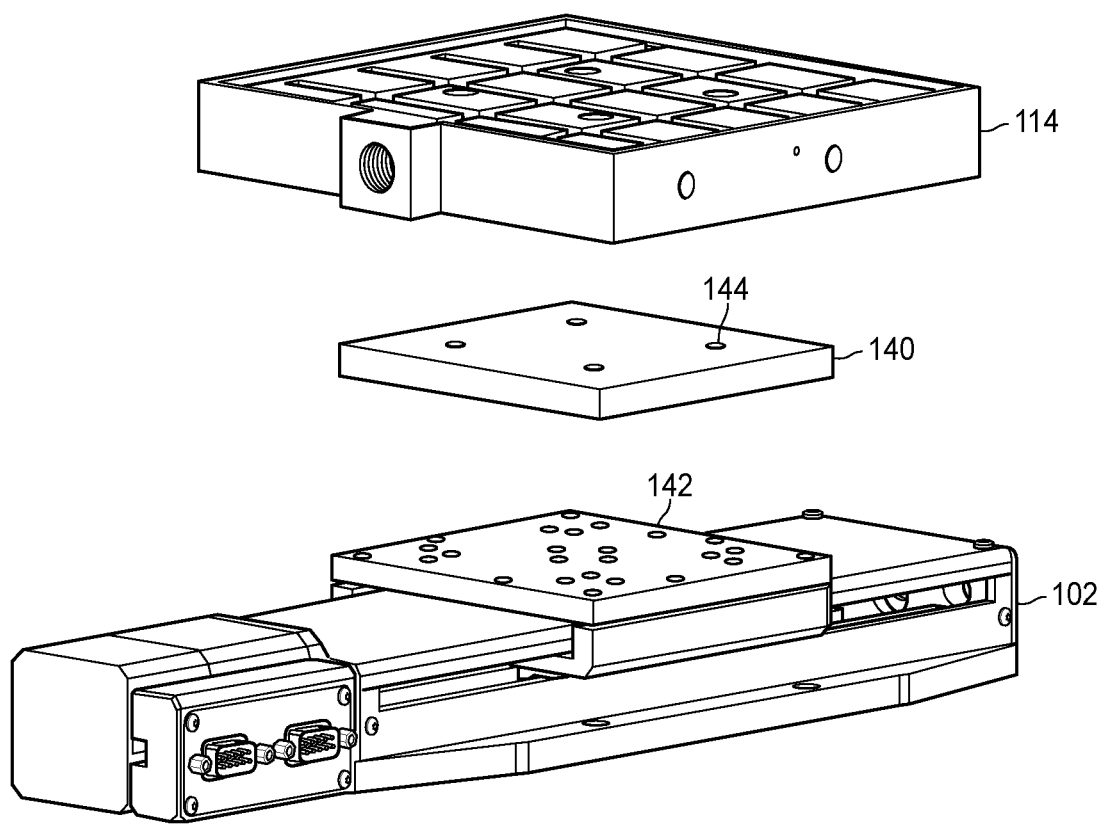
FIG. 7 is an exploded perspective view of an XY stage and a vacuum table.

FIG. 7 is an exploded perspective view of the XY stage 102 and the vacuum table 114. As illustrated in FIG. 7, a rubber pad 140 may be placed between the vacuum table 114 and the XY stage 102 to insulate the XY stage 102 from the heat generated by the vacuum table 114. In particular, the rubber pad 140 may be placed on a surface 142 of the XY stage 102, to which surface 142 the vacuum table 114 is attached. Accordingly, the rubber pad 140 may include apertures 144 sized and positioned to allow fasteners to extend between the vacuum table 114 and the surface 142 of the XY stage 102.

As described above, the membrane 110 may deform when wet by the solvent used in the electrode ink. The vacuum pressure applied by the vacuum table 114 counteracts this tendency by pulling the membrane 110 flat. However, to prevent the membrane 110 from being pulled into the channels 118, one or more intervening surfaces are preferably placed on the vacuum table 114 and, in particular, on the planar surface 116. FIG. 8A depicts an embodiment of a stack 150 that may be placed on the planar surface 116 of the vacuum table 114. The stack 150 and the vacuum table 114 comprising the vacuum table assembly 100.

In an embodiment, the stack 150 includes a perforated sheet 152 and a wire mesh material 154 onto which the membrane 110 is placed. The perforated sheet 152 is a planar sheet having staggered holes 156 that allow the vacuum pressure to transmit through the perforated sheet 152. In embodiments, the perforated sheet 152 is formed of a thermally conductive material, such that the heat from the vacuum table 114 is transmitted to the perforated sheet 152, bringing the heat closer to the membrane 110 such that the solvent of the electrode ink is quickly evaporated and the membrane 110 restored to its generally planar disposition. In embodiments, the perforated sheet 152 is formed from stainless steel. In a particular embodiment, the perforated sheet 152 is 0.024" (0.6 mm) thick, the holes 156 each have a diameter of 0.0625" (1.6 mm) and have a hole-to-hole pitch (center to center) of 0.109" (2.8 mm), and have an open area (i.e., an area of the holes relative to the total surface area) of approximately 30%.

The perforated sheet 152 may nevertheless allow the vacuum pressure from the vacuum table 114 to distort the surface of the membrane 110 by pulling the membrane 110 into the holes 152. In order to prevent such distortion, the wire mesh material 154 is placed over the perforated sheet 152 before placing the membrane 110 on the stack 150. In contrast to the perforated sheet 152, which is preferably rigid, the wire mesh material 154 is generally flexible and sufficiently permeable to transmit the vacuum pressure to the membrane 110 to hold it flat against the wire mesh material 154, which is significantly more flat than applying only the perforated sheet 152. In embodiments, the wire mesh material 154 is formed of a thermally conductive material, such that the heat from the vacuum table 114 is transmitted to the wire mesh material 154, bringing the heat closer yet to the membrane 110 such that the solvent of the electrode ink is quickly evaporated and the membrane 110 restored to its generally planar disposition. In embodiments, the wire mesh material 154 is formed from stainless steel. In a particular embodiment, the wire mesh material 154 is formed from wire having a diameter of 0.0026" (66 μm), mesh openings of 0.0041" (104 μm), and an open area (i.e., an area of the mesh openings relative to the total surface area) of approximately 38%.

FIG. 8B depicts an alternate embodiment of a stack 150A that may be placed on the planar surface 116 of the vacuum table 114. The stack 150 is similar to the stack 150 depicted in FIG. 8A, except that the stack 15A includes an additional layer of wire mesh material 158, even finer than the wire mesh material 154, between the wire mesh material 154 and the membrane 110. In embodiments, the wire mesh material 158 is formed of a thermally conductive material, such that the heat from the vacuum table 114 is transmitted to the wire mesh material 158 via the wire mesh material 154 and the perforated sheet 152, bringing the heat closer yet to the membrane 110 such that the solvent of the electrode ink is quickly evaporated and the membrane 110 restored to its generally planar disposition. In embodiments, the wire mesh material 158 is formed from stainless steel. In a particular embodiment, the wire mesh material 158 is formed from wire having a diameter of 0.001" (25.4 μm), mesh openings of 0.0015" (38.1 μm), and an open area (i.e., an area of the mesh openings relative to the total surface area) of approximately 36%.

FIG. 8C is a side view (not to scale) showing the perforated sheet 152, the wire mesh material 154, and the membrane 110. The perforated sheet 152 has a first, table-facing side 152A and a second, mesh-facing side 152B. The first and second sides 152A, 152B are generally planar, as depicted, excepting of course of the staggered holes 156. While called out here for the purpose of explaining that one side (e.g., the first side 152A) of the perforated sheet 152, when positioned in the stack 150, is adjacent to the working face 116 of the vacuum table 114, and that another side (e.g., the second side 152B) of the perforated sheet 152, when positioned in the stack 150 is adjacent to the wire mesh material 154, the two sides 152A, 152B are not specific in the depicted embodiments, and the perforated sheet 152 may be placed with either side 152A or 152B against the working face 116 of the vacuum table. (Other embodiments are contemplated, though not depicted or described explicitly, in which the sides 152A and 152B may require specific orientation with respect to the face that is adjacent to the working face 116 of the vacuum table 114, as would be appreciated in view of the present description, without departing from the scope of the contemplated embodiments.)

The wire mesh material 154 has a first, sheet-facing side 154A and a second, working side 154B. The first and second sides 154A, 15BB of the wire mesh material 154 are generally planar (though not necessarily rigid), as depicted, excepting of course of the general topography of the mesh. While called out here for the purpose of explaining that one side (e.g., the first side 154A) of the wire mesh material 154, when positioned in the stack 150, is adjacent to the mesh-facing side 152B of the perforated sheet 152, and that another side (e.g., the second side 154B) of the wire mesh material 154, when positioned in the stack 150 is adjacent to the membrane 110 (or to the additional layer of wire mesh material 158), the two sides 154A, 154B are not specific in the depicted embodiments, and the wire mesh material 154 may be placed with either side 154A or 154B against the perforated sheet 152. (Other embodiments are contemplated, though not depicted or described explicitly, in which the sides 154A and 154B may require specific orientation with respect to the face that is adjacent to the perforated sheet 152, as would be appreciated in view of the present description, without departing from the scope of the contemplated embodiments.)

It is worth mention that, in embodiments, the vacuum table 114 may be not be heated directly but, rather, the perforated sheet 152, the wire mesh material 154, and/or the wire mesh material 158 may be heated instead, for example, by passing an electric current through the perforated sheet 152, the wire mesh material 154, and/or the wire mesh material 158.

While the stack 150 and the stack 150A are depicted, respectively, in FIGS. 8A and 8B with each layer being progressively smaller in area than the layer closer to the vacuum table 114, this convention is for illustrative purposes only so that the various layers are readily visible in the illustrations. There is no requirement that each layer is smaller than the layer on which it sits. In embodiments, the perforated sheet 152, the wire mesh material 154 and, if present, the wire mesh material 158, may all be the same size or may even decrease in size with each layer closer to the vacuum table 114. In preferred embodiments, the area covered by the membrane 110 has beneath it the perforated sheet 152, the wire mesh material 154 and, if present, the wire mesh material 158. In other preferred embodiments, at least the area of the membrane 110 on which electrode ink will be deposited has beneath it the perforated sheet 152, the wire mesh material 154 and, if present, the wire mesh material 158.

Figure 9:
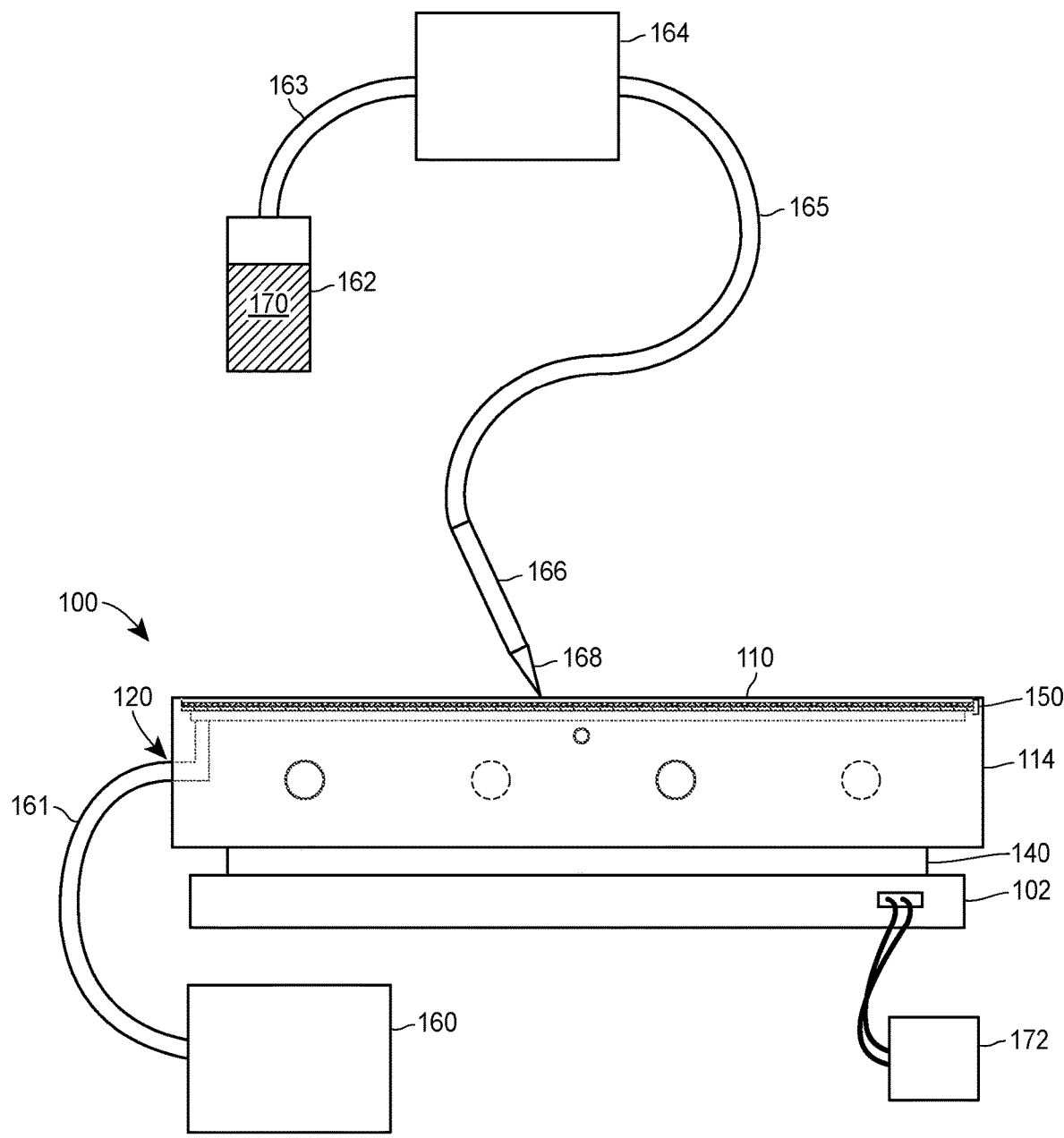
FIG. 9 depicts various components of the system according to the present description.

FIG. 9 depicts the vacuum table assembly 100 in the context of the broader electrode forming system. The vacuum table assembly 100 is physically coupled to the XY stage 102, with the rubber pad 140 disposed between the two. A pump 160 is coupled via a tube 161 or other fluid conduit to the port 120 of the vacuum table 114, and pumps air from the port 120 to create suction in the plurality of channels 118 of the vacuum table 114. The membrane 110 sits atop the stack 150, which is placed on the surface 116 of the vacuum table 114. A source 162 of electrode ink 170 is fluidically coupled by a polytetrafluoroethylene tube 163 to a pump 164 that, in turn, is fluidically coupled by a polytetrafluoroethylene tube 165 to a micropipette or nanopipette 166 having a tip 168 disposed at or near the membrane 110. The pipette 166 and its tip 168 are fixed in space such that the tip 168 is configured to dispense the electrode ink 170 onto the membrane 110 at positions according to the movement, relative to the tip 168, of the XY stage 102 and the vacuum table 114 disposed thereon. A controller 172 communicatively coupled to the XY stage 102 controls the XY stage 102 to cause movement in the X and Y directions, thereby controlling the position of the pipette tip 168 relative to the membrane 110. The controller 172 (or another controller) may control the pump 160 and/or the pump 164.

In embodiments, the pump 164 is a peristaltic pump configured to move the electrode ink 170 through the polytetrafluoroethylene tube 163 (which is contiguous in such embodiments with the tube 165), into the pipette 166, and through the tip 168 onto the membrane 110. In particular embodiments, the peristaltic pump has a pump rate of approximately 0.31 μl/sec, of 0.25 to 0.35 μl/sec, of 0.20 to 0.40 μl/sec, of 0.29 to 0.33 μl/sec, of less than 0.35 μl/sec, of less than 0.30 μl/sec, of less than 0.50 μl/sec, or of less than 1 μl/sec.

The pipette tip 168 may have an aperture of 200 μm in embodiments. In other embodiments, the tip 168 may have an aperture of between 100 μm and 300 μm, between 150 μm and 250 μm, between 175 μm and 225 μm, of greater than 200 μm, of less than 250 μm, of less than 350 μm, or of less than 150 μm. In general, the aperture size of the pipette tip 168 is proportional to a size of particles suspended in the electrode ink 170, and is sized to provide sufficient control of ink deposition while preventing the aperture of the pipette tip 168 from clogging.

Figure 10:
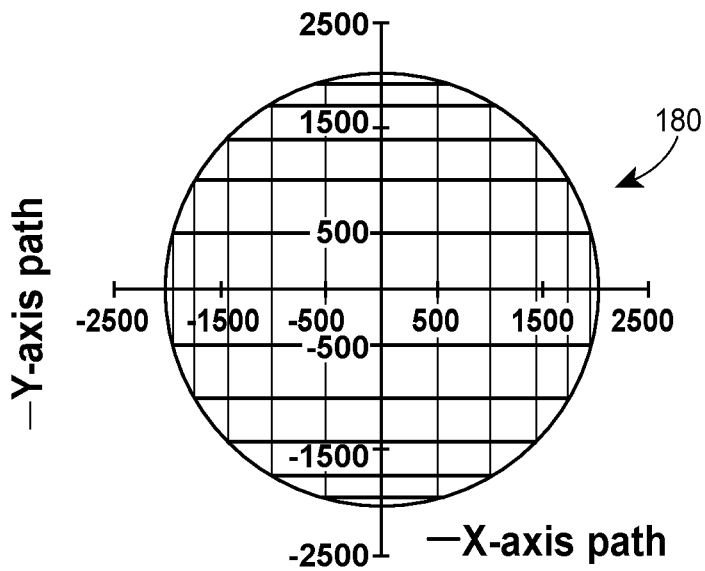
FIG. 10 depicts a pattern according to which the XY table is operated in embodiments.

By moving the XY stage 102 in the X- and/or Y-direction (s) and, as a result, causing the vacuum table assembly 100 to move correspondingly with respect to the pipette tip 168 positioned adjacent to the membrane 110, the pipette tip 168 may deposit electrode ink on the membrane 110 in a desired pattern. The pattern may be programmed into a controller that controls the XY stage 102, as further described below. FIG. 10 shows one exemplary pattern 180 in which ink could be deposited on the membrane 110. By taking into consideration the rate at which ink is being dispensed from the pipette tip 168, the width of the ink's dispersion as it contacts the surface (which, as will be appreciated, will be a function of its viscosity and surface tension, among other things), and the desired thickness of the ink layer on the membrane 110, the XY stage 102 can be programmed to move the vacuum table assembly 114 such that a layer of ink is deposited on the membrane 110. In embodiments, the XY stage 102 has a resolution of 0.05 μm or less, allowing the XY stage 102 to cause lines of electrode ink to be deposited on the membrane 110 0.05 μm apart. In embodiments, the XY stage 102 has a resolution of 0.25 μm or less, of 0.2 μm or less, of 0.15 μm or less, or of 0.1 μm or less.

Figure 11:
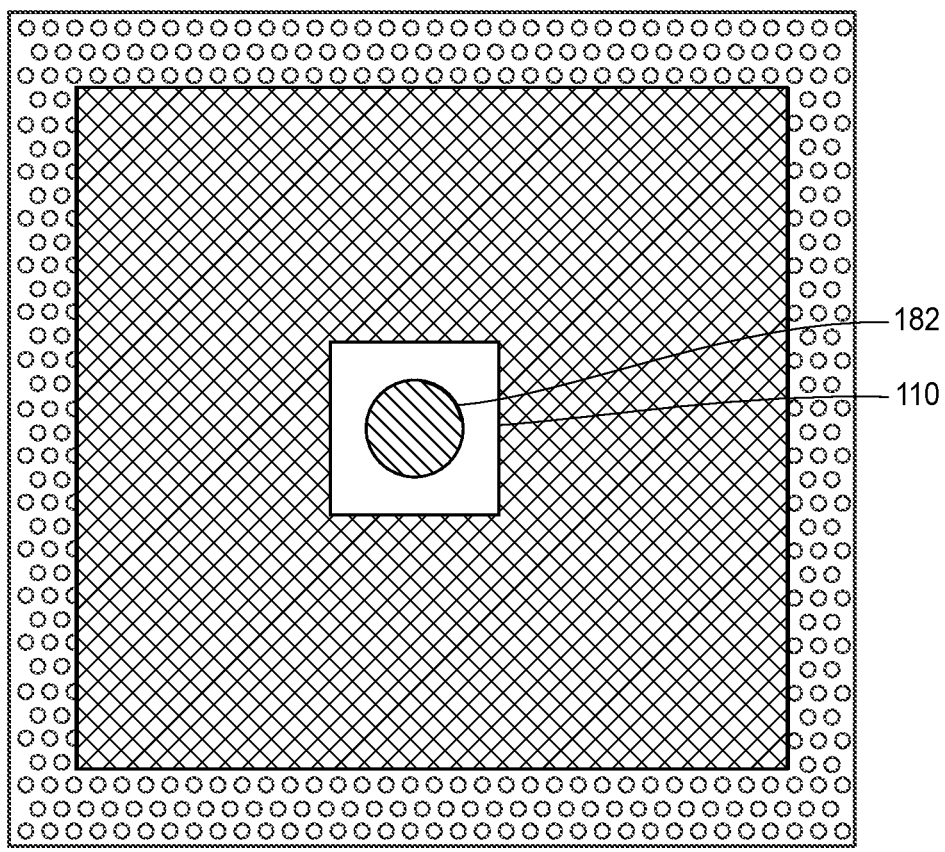
FIG. 11 depicts an electrode printed on a membrane placed on a vacuum table assembly according to the present description.

The membrane 110 may be sized according to the desired size of the electrode or electrodes to be created. FIG. 11, for example, depicts a membrane 110 disposed on the stack 150 and having printed on it an electrode 182. The electrode 182 may be printed by moving the XY stage 102 relative to the pipette tip 168 while the pump 164 is pumping the ink 170, for example in the pattern depicted in FIG. 10. It should be understood that, in embodiments in which the membrane 110 does not cover most or all of the surface of the wire mesh material 154 and/or the perforated sheet 152, an additional material may be required to be positioned over the wire mesh material 154 and/or the perforated sheet 152 such that the vacuum pressure holds the membrane 110 flat against the wire mesh material 154 (rather than merely pulling air through the exposed wire mesh material 154 and the exposed perforated sheet 152). The additional material may be any flexible material (e.g., a non-air permeable material such as a thin plastic film) sufficient to ensure the vacuum pressure pulls the membrane 110 against the surface of the wire mesh material 154.

Figure 12:
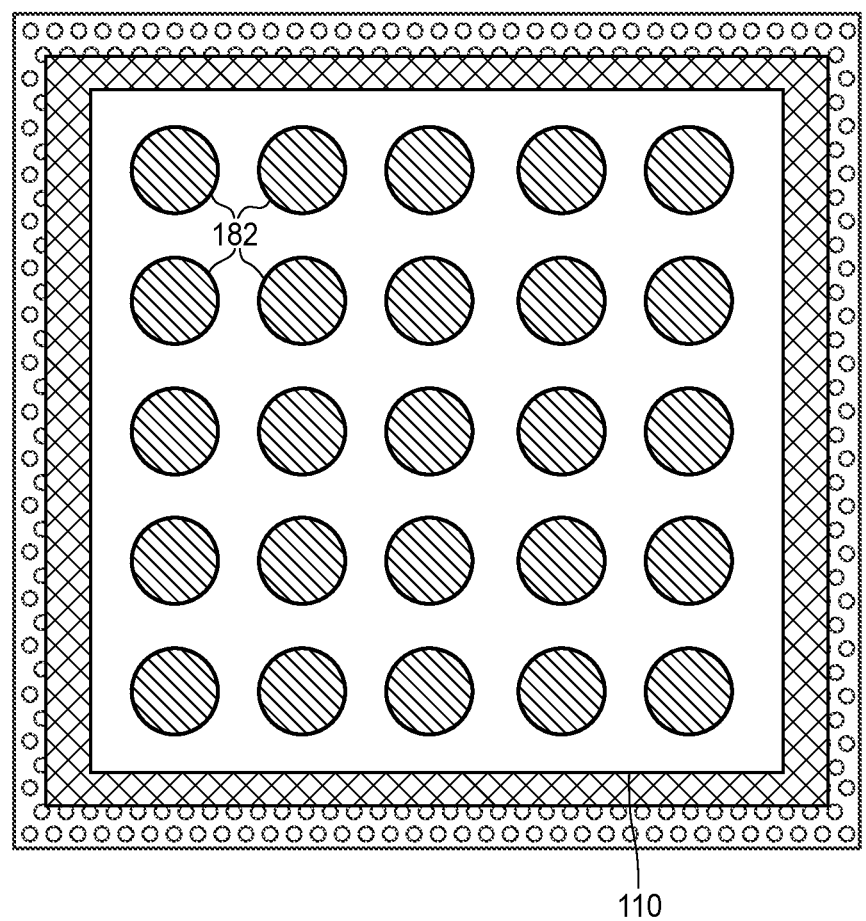
FIG. 12 depicts a multiplicity of electrodes printed on a membrane placed on a vacuum table assembly according to the present description.

In embodiments, multiple electrodes 182 may be printed on the membrane 110, as depicted in FIG. 12. The multiple electrodes 182 may be printed in any desired pattern. Where each of the electrodes 182 is printed using the same electrode ink 170, the electrodes 182 may be identical, or may vary in size, shape, or thickness of the deposited layer of electrode ink 170. In other embodiments, different ones of the electrodes 182 may be printed using corresponding different formulations of electrode ink. That is, a first electrode ink formulation may be used to print one or more electrodes 182 in a first set of electrodes 182, while a second, different ink formulation may be used to print one or more electrodes 182 in a second set of electrodes 182. The electrodes 182 in the first set, in the second set, or in both sets, may likewise vary in size, shape, or thickness of the deposited layer of the respective electrode ink 170.

Electrodes 182 created from different ink formulations may respectively be formed using different pipettes 166, or by the same pipette 166 after the pipette 166 has been cleaned with a proper solvent such as Acetone or Isopropyl Alcohol, fluidically coupled to an ink source filled with a different ink formulation. In some embodiments, however, multiple ink sources 162 (e.g., an array of ink sources) and may be fluidically coupled to a corresponding array of pipettes 166 via corresponding pumps 164 (or a single pump 164 with multiple channels) to create multiple electrodes 182 simultaneously on the membrane 110, as will be readily understood in view of the remainder of this description.

Of course, while depicted as circular in the various figures, the electrodes need not be circular and can, in fact, be any shape desirable for the application in question. Additionally, while, in embodiments, the electrodes are approximately 0.785 cm$^2$ (1 cm diameter), the size of the electrodes may likewise be any size desirable for the application in question. In embodiments, dimensions of the working surface 116 of the vacuum table are 6 inches by 6 inches (15.24 cm by 15.24 cm), providing a working surface 116 with an area of 36 in$^2$ (232.26 cm$^2$), and the membrane 110 has dimensions of 3.94 inches by 3.94 inches (10 cm by 10 cm), providing an area of 15.52 in$^2$ (100 cm$^2$) on which electrodes can be printed. A pattern of 25, equally spaced, electrodes having diameters of 1 cm may be created on such a membrane, in embodiments.

Figure 13:
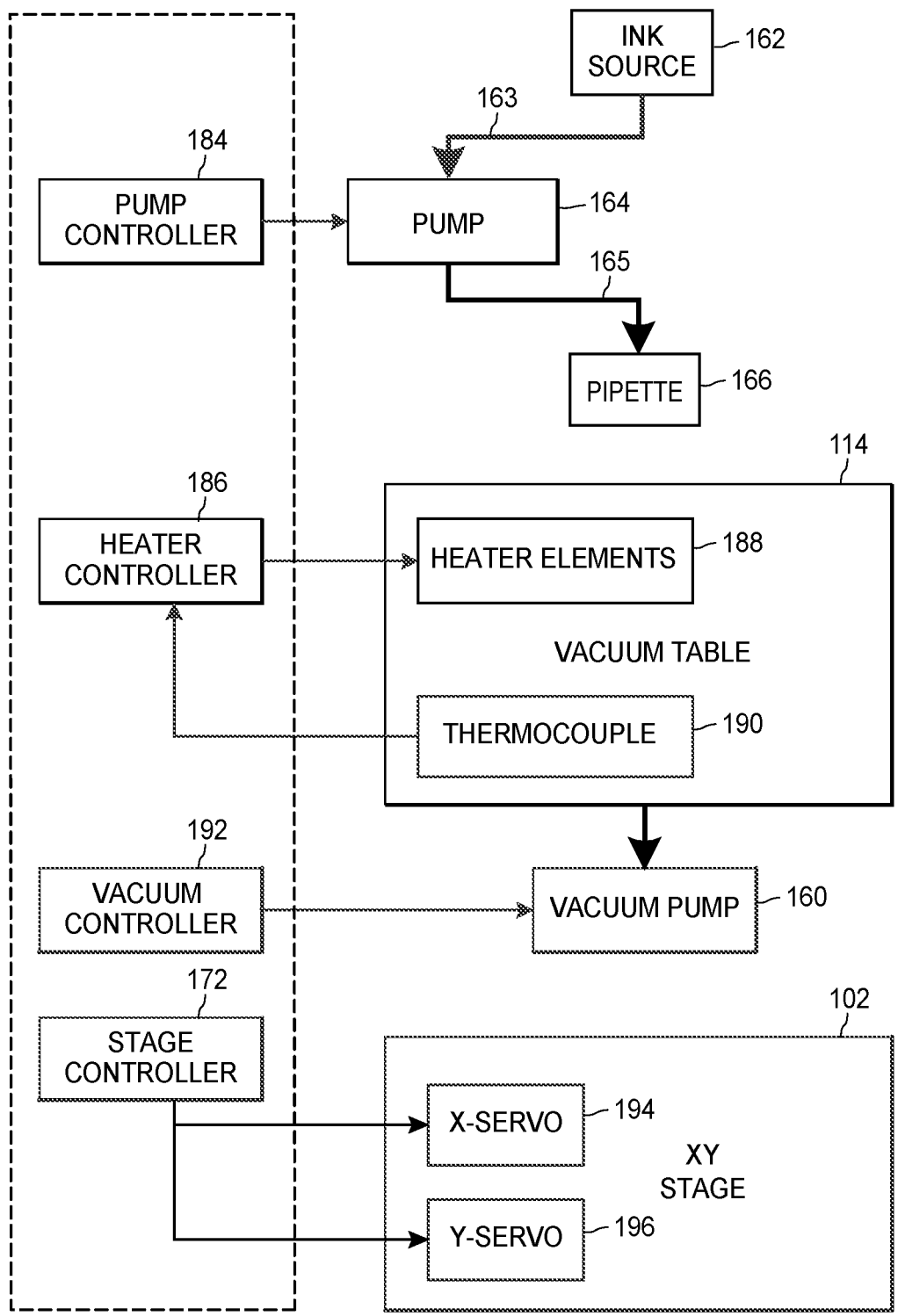
FIG. 13 is a block diagram depicting the various elements of an embodiment of the system according to the present description.

FIG. 13 is a block diagram of an exemplary system according to the presently described embodiments. As illustrated in FIG. 13 a pump controller 184 may control the pump 164 that delivers the electrode ink 170 from the ink source 162 to the pipette 166. Controlling the pump 164 may include controlling the on/off status of the pump 164 and/or may include controlling the rate at which the pump 164 is pumping the electrode ink 170. A heater controller 186 may control heater elements 188 disposed in the aperture(s) 132A, 132B of the vacuum table 114, controlling the current delivered to the heater elements 188 and, as a result, the heat generated by the heater elements 188, to control the temperature of the vacuum table 114. In embodiments, the heater controller 186 may receive a signal from a thermocouple 190 disposed in the aperture 136 of the vacuum table, the signal representing a temperature of the vacuum table 114, and may control the heater elements 188 according, in part, to the signal received from the thermocouple 190. A vacuum controller 192 may control the on-off state of the vacuum pump 160 and, in embodiments, may control the level of vacuum drawn by the pump 160. The stage controller 172, as described above, may control the position and movement of the XY stage 102 and, in particular, may control an X-servo 194 and a Y-servo 196 in the XY stage 102 that cause the surface 142 (and the vacuum table assembly 100 coupled to the surface 142) to move relative to the pipette 166. While described herein as separate controllers, the pump controller 184, the heater controller 186, the vacuum controller 192, and the stage controller 172 may be separate controllers or may be integrated into one or more controller devices. (For example, a computer workstation may be programmed, e.g., using a systems engineering software, to control all of the devices.)

Figure 14:
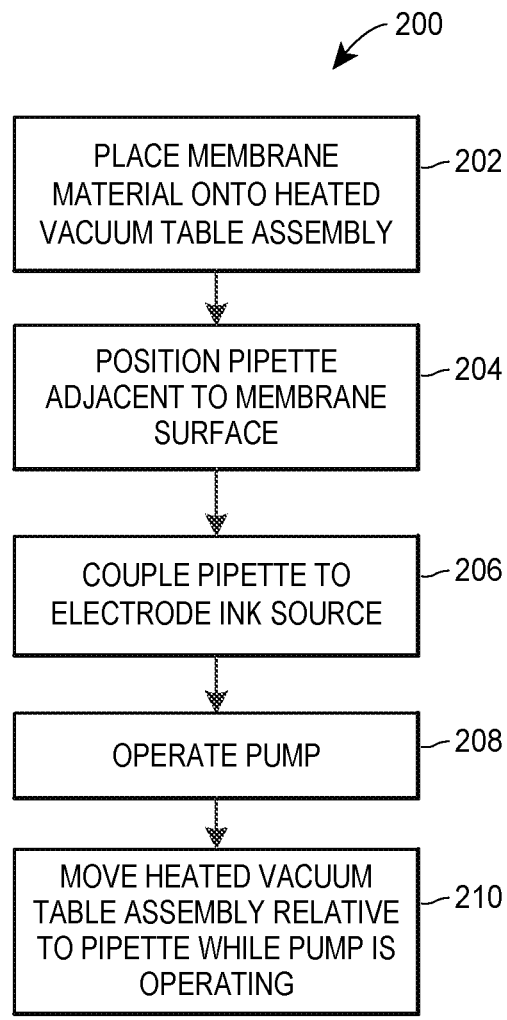
FIG. 14 is a flow chart depicting a method of creating one or more electrodes according to the present description.

FIG. 14 is a flow chart depicting an example method 200 for creating an electrode using the devices and systems described above. The membrane material 110 may be placed onto the heated vacuum table assembly 100 (block 202). Of course, this may involve placing the stack 150 onto the vacuum table 114 which, in turn, may involve placing the perforated sheet 152 on the surface 116 of the vacuum table 114, placing the wire mesh material 154 (and possibly the wire mesh material 158) perforated sheet 152, and then placing the membrane 150 on the wire mesh material 154 or 158. Placing the membrane material 110 on the heated vacuum table assembly 100 may also require heating the vacuum table 114, either before or after the membrane 110 is placed thereon. The method 200 also includes positioning the pipette 166 adjacent to the surface of the membrane 110 (block 204) and coupling the pipette 166 to the source 162 of the electrode ink 170 (block 206). Further, the method 200 includes operating the pump 164 to cause the electrode ink 170 to be dispensed from the pipette 166 through the pipette tip 168 on to the surface of the membrane 110 (block 208). The vacuum table 114 is moved relative to the pipette 166 using the XY stage 102 while the pump 164 is operating to cause the electrode to be printed on the membrane (block 210).

Of course, a person of ordinary skill in the art will readily appreciate that, unless one step is a necessary prerequisite to another, the order of the steps may vary from that described above.

The methods and systems described herein may, in embodiments, be employed to create electrode structures with multiple layers. The multiple layers may be made of the same composition or different compositions, may be of different thicknesses or the same thicknesses, may be patterned, graded, porous, etc. Any individual layer (whether part of a multiple layer electrode or a single layer electrode) may be patterned in any number of ways, limited only by the movement of the XY stage 102.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A system comprising: a linear stage having a platform and a base, the platform movable along X and Y axes according to electronic signals received from a controller device communicatively coupled to the linear stage; a vacuum source configured to create vacuum pressure; a heated vacuum table physically coupled to the platform of the linear stage and having a working face parallel to both the X and Y axes, the working face having formed therein a plurality of channels in fluid communication with a vacuum port formed in the vacuum table, the vacuum port coupled to the vacuum source; a sheet of perforated heat-conductive material sized to fit on the working face of the vacuum table, the sheet having a table-facing side placed against the working face of the vacuum table and a mesh-facing side, and having staggered holes configured to evenly distribute the vacuum pressure from the plurality of channels to the mesh side of the sheet; a heat-conductive wire mesh having a sheet-facing side placed against the mesh-facing side of the sheet and a working side, the wire mesh having openings smaller than the staggered holes such that a membrane material placed on the working side of the wire mesh is not deformed by the vacuum pressure; and a nanopipette or micropipette coupled to a pump and configured to deposit ink onto an exposed surface of the membrane material as the controller device causes the linear stage to move the heated vacuum table to control deposition of the ink onto the exposed surface of the membrane.

2. A system according to aspect 1, wherein the heated vacuum table comprises a heating element disposed in an aperture, the heating element positioned to distribute heat evenly across the working face of the vacuum table.

3. A system according to aspect 1, wherein the heated vacuum table comprises a plurality of heating elements, each disposed in a corresponding aperture, the plurality of heating elements positioned to distribute heat event across the working face of the vacuum table.

4. A system according to any one of aspects 1 to 3, wherein the heated vacuum table comprises a thermocouple configured to detect a temperature of the working face of the heated vacuum table.

5. A system according to aspect 4, wherein the thermocouple is communicatively coupled to a heater control device, and wherein the heater control device controls the temperature of the heated vacuum table.

6. A system according to any one of aspects 1 to 5, further comprising a heat-insulating material disposed between the platform of the linear stage and the heated vacuum table.

7. A system according to any one of aspects 1 to 6, wherein the linear stage has a resolution of 0.05 µm or less.

8. A system according to any one of aspects 1 to 7, wherein the system is configured to maintain the working face of the heated vacuum table at a temperature between 80° C. and 110° C.

9. A system according to any one of aspects 1 to 7, wherein the system is configured to maintain the working face of the heated vacuum table at a temperature between 80° C. and 90° C.

10. A system according to any one of aspects 1 to 7, wherein the system is configured to maintain the working face of the heated vacuum table at a temperature between 80° C. and 100° C.

11. A system according to any one of aspects 1 to 10, wherein the plurality of channels formed in the working face of the heated vacuum table comprise two sets of channels, each set comprising a plurality of parallel channels, the channels of each set being perpendicular to the channels of the other set, and both sets of channels being parallel to the working face of the heated vacuum table.

12. A system according to any one of aspects 1 to 11, wherein the sheet of perforated heat-conductive material comprises a rigid material.

13. A system according to any one of aspects 1 to 12, wherein the sheet of perforated heat-conductive material is formed of stainless steel.

14. A system according to any one of aspects 1 to 13, wherein the heat-conductive wire mesh is formed of stainless steel.

15. A system according to any one of aspects 1 to 14, wherein the nanopipette or micropipette has a tip with an aperture selected to be proportional to a size of one or more particles suspended in the ink.

16. A system according to any one of aspects 1 to 15, further comprising a second layer of wire mesh disposed between the heat-conductive wire mesh and the sheet of perforated heat-conductive material.

17. A method for creating a catalyst coated membrane electrode, the method comprising: placing a membrane material onto a heated vacuum table assembly; positioning a nanopipette or micropipette adjacent to the membrane material; coupling the nanopipette or micropipette to a source of electrode ink, the electrode ink comprising a solvent, a catalyst, and an ionomer; operating a pump coupled to the nanopipette or micropipette and to the source of electrode ink to cause the electrode ink to be dispensed from the nanopipette or micropipette; and moving the heated vacuum table assembly relative to the nanopipette or micropipette to cause the electrode ink to be deposited onto the membrane material in a pattern defined by the movement of the heated vacuum table.

18. A method according to aspect 17, wherein the heated vacuum table assembly comprises: a linear stage having a platform and a base, the platform movable along X and Y axes according to electronic signals received from a controller device communicatively coupled to the linear stage; a heated vacuum table physically coupled to the platform of the linear stage and having a working face parallel to both the X and Y axes, the working face having formed therein a plurality of channels in fluid communication with a vacuum port formed in the vacuum table, the vacuum port configured to be coupled to a vacuum source; a sheet of perforated heat-conductive material sized to fit on the working face of the vacuum table, the sheet having a table-facing side placed against the working face of the vacuum table and a mesh-facing side, and having staggered holes configured to evenly distribute the vacuum pressure from the plurality of channels to the mesh side of the sheet; and a heat-conductive wire mesh having a sheet-facing side placed against the mesh-facing side of the sheet and a working side, the wire mesh having openings smaller than the staggered holes such that the membrane material placed on the working side of the wire mesh is not deformed by the vacuum pressure.

19. A method according to aspect 18, wherein the heated vacuum table comprises: a plurality of heating elements disposed each disposed in a corresponding aperture in the heated vacuum table, the plurality of heating elements configured to evenly distribute heat across the working face of the vacuum table; and a thermocouple configured to detect a temperature of the working face of the heated vacuum table.

20. A method according to either aspect 18 or aspect 19, wherein the plurality of channels formed in the working face of the heated vacuum table comprise two sets of channels, each set comprising a plurality of parallel channels, the channels of each set being perpendicular to the channels of the other set, and both sets of channels being parallel to the working face of the heated vacuum table.

21. A method according to any one of aspects 17 to 20, wherein the membrane material is sized such that vacuum is created between the heated vacuum table assembly and the membrane material.

22. A method according to any one of aspects 17 to aspect 20, wherein the membrane material cooperates with another material to create vacuum between the heated vacuum table assembly and the membrane material when the size of the membrane material alone is too small to create vacuum between the heated vacuum table assembly and the membrane material.

23. A method according to any one of aspects 17 to 22, further comprising heating the heated vacuum table assembly to a temperature that causes the solvent in the electrode ink to evaporate without damaging the membrane material.

24. A method according to any one of aspects 17 to 23, wherein the pump is a peristaltic pump.

25. A method according to any one of aspects 17 to 24, further comprising creating a plurality of discrete electrodes on the membrane material.

26. A method according to aspect 25, wherein each of the plurality of discrete electrodes comprises a different ink composition.

27. A method according to any one of aspects 17 to 26, wherein: positioning the nanopipette or micropipette adjacent to the membrane material comprises positioning a plurality of nanopipettes or micropipettes adjacent to the membrane material, coupling the nanopipette or micropipette to a source of electrode ink comprises coupling each of the plurality of nanopipettes or micropipettes to a corresponding source of electrode ink, operating the pump causes each of the nanopipettes or micropipettes to dispense electrode ink from its corresponding source of electrode ink, and the method causes a plurality of electrodes to be created simultaneously.

28. A method according to aspect 27, wherein: each of the corresponding sources of electrode ink contains an electrode ink having a different composition from the others, and the plurality of electrodes created simultaneously have different properties from one another.

29. A method according to either aspect 27 or 28, wherein positioning the plurality of nanopipettes or micropipettes adjacent to the membrane material comprises positioning the plurality of nanopipettes or micropipettes such that the created electrodes are positioned to cooperate with an electrode testing apparatus to test properties of each of the created electrodes.

The invention claimed is:
1. A system comprising:
a linear XY stage having a platform and a base, the platform movable along X and Y axes over at least an area of an exposed surface of a membrane material onto which a pattern is to be printed according to electronic signals received from a controller device communicatively coupled to the linear XY stage;
a vacuum source configured to create vacuum pressure;
a heated vacuum table physically coupled to the platform of the linear XY stage and having a working face parallel to both the X and Y axes, the working face having formed therein a plurality of channels in fluid communication with a vacuum port formed in the vacuum table, the vacuum port coupled to the vacuum source;
a sheet of perforated heat-conductive material sized to fit on the working face of the heated vacuum table, the sheet having a table-facing side placed against the working face of the heated vacuum table and a mesh-facing side, and having staggered holes configured to evenly distribute the vacuum pressure from the plurality of channels to the mesh side of the sheet;

a heat-conductive wire mesh having a sheet-facing side placed against the mesh-facing side of the sheet and a working side, the wire mesh having openings smaller than the staggered holes such that the membrane material placed on the working side of the wire mesh is not deformed by the vacuum pressure; and a nanopipette or a micropipette coupled to a peristaltic pump, and configured to deposit ink onto the exposed surface of the membrane material as the controller device causes the linear XY stage to move the heated vacuum table, wherein the nanopipette or the micropipette is fixed in space such that moving the platform in the pattern relative to the nanopipette or the micropipette causes the ink to be deposited onto the area of the exposed surface of the membrane material in the pattern defined by moving of the platform.

2. A system according to claim 1, wherein the heated vacuum table comprises a heating element disposed in an aperture, the heating element positioned to distribute heat evenly across the working face of the heated vacuum table.

3. A system according to claim 1, wherein the heated vacuum table comprises a plurality of heating elements, each disposed in a corresponding aperture, the plurality of heating elements positioned to distribute heat event across the working face of the heated vacuum table.

4. A system according to claim 1, wherein the heated vacuum table comprises a thermocouple configured to detect a temperature of the working face of the heated vacuum table.

5. A system according to claim 4, wherein the thermocouple is communicatively coupled to a heater control device, and wherein the heater control device controls the temperature of the heated vacuum table.

6. A system according to claim 1, further comprising a heat-insulating material disposed between the platform of the linear XY stage and the heated vacuum table.

7. A system according to claim 1, wherein the linear XY stage has a resolution of 0.05 µm or less.

8. A system according to claim 1, wherein the system is configured to maintain the working face of the heated vacuum table at a temperature between 80° C. and 110° C.

9. A system according to claim 1, wherein the plurality of channels formed in the working face of the heated vacuum table comprise two sets of channels, each set comprising a plurality of parallel channels, the channels of each set being perpendicular to the channels of the other set, and both sets of channels being parallel to the working face of the heated vacuum table.

10. A system according to claim 1, wherein the sheet of perforated heat-conductive material is formed of stainless steel.

11. A system according to claim 1, wherein the heat-conductive wire mesh is formed of stainless steel.

12. A system according to claim 1, wherein the nanopipette or micropipette has a tip with an aperture selected to be proportional to a size of one or more particles suspended in the ink.

13. A system according to claim 1, further comprising a second layer of wire mesh disposed between the heat-conductive wire mesh and the sheet of perforated heat-conductive material.

14. A system according to claim 1, wherein the linear XY stage has a resolution of 0.025 µm or less.

15. A system according to claim 1, wherein the peristaltic pump is configured to have a flow rate of between 0.20 µl/sec and 0.40 µl/sec.

* * * * *